US012771634B2

(12) United States Patent
Capper et al.

(10) Patent No.: US 12,771,634 B2
(45) Date of Patent: Oct. 20, 2026

(54) EFFICIENT FLOW STATE REPLICATION FOR DISTRIBUTED AND HIGHLY AVAILABLE STATEFUL NETWORK SERVICES

(71) Applicant: Arista Networks, Inc., Santa Clara, CA (US)

(72) Inventors: Simon Capper, San Jose, CA (US); Peter Lam, Anmore (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 224 days.

(21) Appl. No.: 18/391,221

(22) Filed: Dec. 20, 2023

(65) Prior Publication Data

US 2025/0211520 A1 Jun. 26, 2025

(51) Int. Cl.
*H04L 45/28* (2022.01)
*H04L 45/00* (2022.01)
*H04L 45/745* (2022.01)

(52) U.S. Cl.
CPC ............ *H04L 45/28* (2013.01); *H04L 45/566* (2013.01); *H04L 45/745* (2013.01)

(58) Field of Classification Search
CPC ...... H04L 45/28; H04L 45/566; H04L 45/745
See application file for complete search history.

(56) References Cited

U.S. PATENT DOCUMENTS 6,735,205 B1 * 5/2004 Mankude ............ H04L 67/1006 370/428
9,832,069 B1 * 11/2017 Cleveland ........... H04L 41/0668
12,039,358 B1 * 7/2024 Addepalli ........... G06F 9/45558
12,107,776 B2 * 10/2024 Thirumurthi ......... H04L 47/125
2013/0265883 A1 * 10/2013 Henry ................... H04L 43/028 370/241
2014/0372567 A1 * 12/2014 Ganesh ............... H04L 67/1001 709/219
2015/0341473 A1 * 11/2015 Dumitrescu ........ H04L 45/7453 370/392
2016/0070700 A1 * 3/2016 Biswas ............... G06F 16/2255 707/698
2019/0146887 A1 * 5/2019 Blea .................... G06F 11/2023 714/4.11
2020/0287964 A1 * 9/2020 Capper ............... H04L 67/1029
2021/0135993 A1 * 5/2021 Mittal ..................... H04L 45/24

* cited by examiner

*Primary Examiner* — Vivek Srivastava
(74) *Attorney, Agent, or Firm* — Fountainhead Law Group, PC

(57) ABSTRACT

Techniques for replicating flow state information in a distributed and highly available stateful network service are provided. In some embodiments, these techniques enable each node of a cluster implementing the network service to replicate its flow state information for a network flow to only one other node (acting as a backup), rather than to all other nodes in the cluster. This advantageously reduces the overhead incurred by the cluster for replicating and maintaining such flow state information and allows the network service to scale to large cluster sizes.

20 Claims, 9 Drawing Sheets

EFFICIENT FLOW STATE REPLICATION FOR DISTRIBUTED AND HIGHLY AVAILABLE STATEFUL NETWORK SERVICES

BACKGROUND

Network services are applications that enhance the capabilities, management, and/or security of computer networks by processing the traffic passing through those networks in some manner. Stateful network services are network services that store flow state information for the network flows they encounter and process packets based on the stored flow state information. One example of a stateful network service is a firewall.

In enterprise environments, stateful network services are often implemented in a distributed fashion (i.e., via a cluster of multiple networked machines, known as nodes) and designed to support high availability (HA). For such distributed and highly available stateful network services, it is important that all of the packets belonging to the same network flow are forwarded to the same node of the cluster during normal operation, as this ensures that each node has the flow state information it needs to correctly carry out its processing. Further, for HA purposes, it is important that the flow state information stored by each node is periodically copied (i.e., replicated) to other nodes serving as backups so that those backup nodes can take over in the case of a node failure.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

Embodiments of the present disclosure are directed to techniques for efficiently replicating flow state information in a distributed and highly available stateful network service.

In some embodiments, these techniques enable each node of the cluster implementing the network service to replicate its flow state information for a network flow to only one other node (acting as a backup), rather than to all other nodes in the cluster. This advantageously reduces the overhead incurred by the cluster for replicating and maintaining such flow state information and allows the network service to scale to large cluster sizes.

1. Example Environment and Solution Architecture

Figure 1:
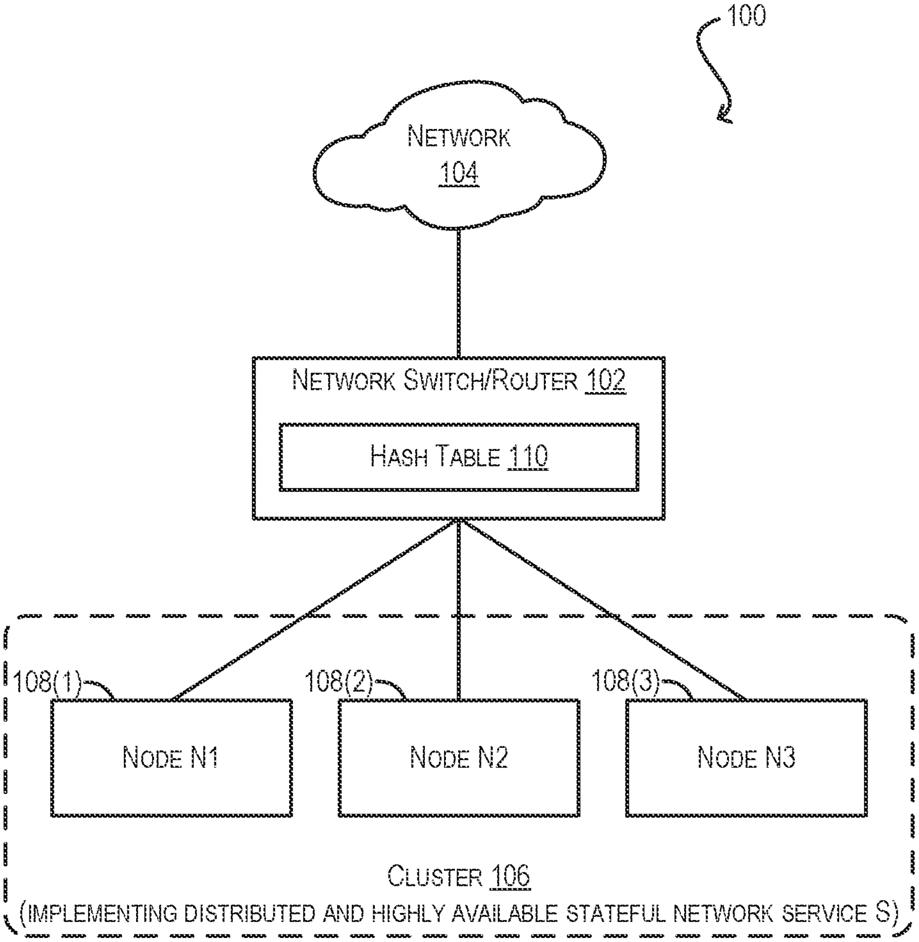
FIG. 1 depicts an example environment in accordance with certain embodiments of the present disclosure.

FIG. 1 is a simplified block diagram of an example environment 100 in which the techniques of the present disclosure may be implemented. As shown, environment 100 includes a network switch or router 102 that is communicatively coupled with a computer network 104 and a cluster 106 of nodes N1, N2, and N3 (reference numerals 108(1)-(3)) that implement a distributed and highly available stateful network service S. Network 104 may be, e.g., a data center or enterprise network. Service S may be, e.g., a distributed firewall, network address translation (NAT) service, network load balancer, or any other type of distributed network service that (a) relies on saved flow state information to carry out its processing of network traffic, and (b) employs redundancy/HA techniques to maintain a certain level of performance in the face of node failures. Although exactly three nodes are shown in FIG. 1, cluster 106 may include any number of nodes.

In accordance with the present disclosure, network switch/router 102 is configured to distribute network traffic (packets) originating from network 104 among the nodes of cluster 106 for the purpose of being processed by service S. Network switch/router 102 sends each packet to a single node for processing because the nodes generally work independently of each other. Upon receiving a packet, the receiving node processes it per the functionality of service S and, if appropriate, returns the processed packet to network switch/router 102. Network switch/router 102 then forwards the packet for delivery to its intended destination in network 104 or beyond.

Figure 2:
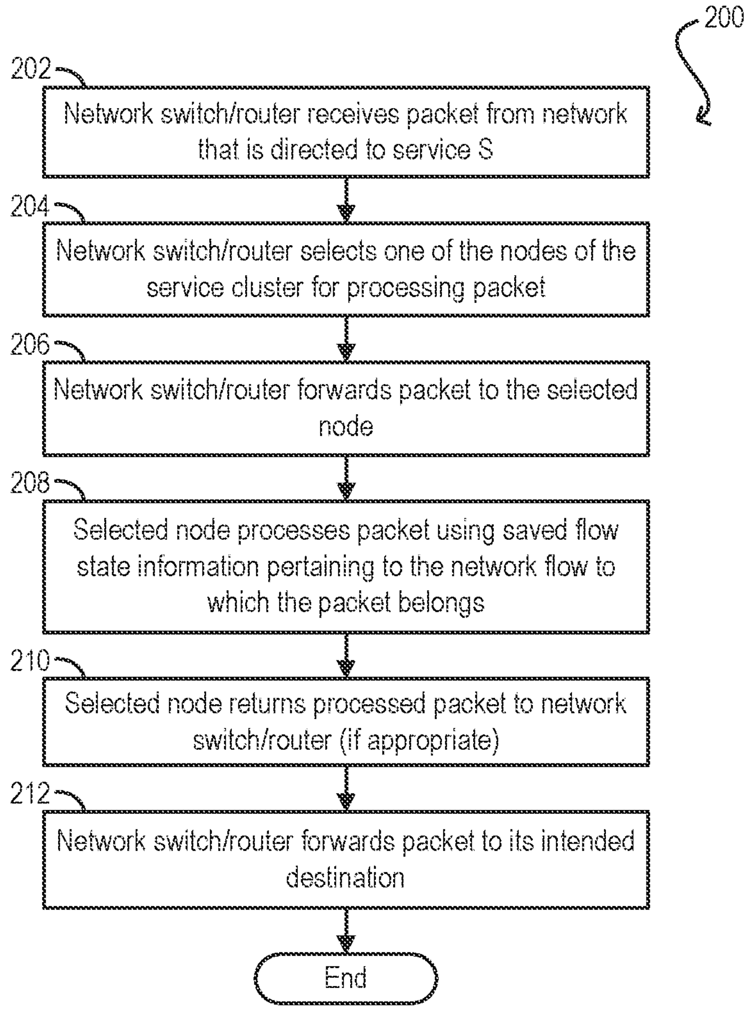
FIG. 2 depicts a flowchart of an example packet flow through the environment of FIG. 1 in accordance with certain embodiments of the present disclosure.

By way of example, FIG. 2 depicts a flowchart 200 of a typical packet flow through network switch/router 102 and the nodes of cluster 106 during normal operation. At block 202, network switch/router 102 receives a packet from network 104 that is directed to service S. For instance, the packet may include an overlay network (e.g., VXLAN) header that identifies a virtual Internet Protocol (IP) address of service S as a tunnel destination of the packet.

At block 204, network switch/router 102 selects one of the nodes of cluster 106 for processing the packet. Because service S is stateful, network switch/router 102 performs this node selection in a manner that ensures all packets belonging to the same network flow are forwarded to and processed by the same node. This avoids a scenario in which a node receives a packet that belongs to a network flow for which the node does not have appropriate flow state information. As used herein, a network flow is a sequence of packets that is transmitted between two network endpoints as part of a communication session, such as a Transport Control Protocol (TCP) session. In the case of TCP/IP, a network flow is typically identified by the 5-tuple of [source IP address, source port, destination IP address, destination port, protocol] fields within a packet, such that all packets with the same values for this 5-tuple over some window of time belong to the same network flow.

One method for performing the node selection at block 204 is a flow hashing technique known as resilient hashing. This involves maintaining, by network switch/router 102, a hash table (shown via reference numeral 110 in FIG. 1) comprising B table entries (referred to as buckets), where B is equal to the total number of nodes in cluster 106 (denoted herein as G) multiplied by a replication factor R. Each bucket of hash table 110 is identified by a unique bucket index (e.g., a number from 1 to B) and is associated with a node in cluster 106. Further, each node is associated with multiple (at least R) buckets in the hash table. For example, Table 1 below depicts an example representation of hash table 110 in the scenario where replication factor R=2. Because there are three nodes in cluster 106, the number of buckets B in this representation is 3×2=6.

TABLE 1

| Bucket Index | Node Identifier (ID) |
|---|---|
| 1 | N1 |
| 2 | N1 |
| 3 | N2 |
| 4 | N2 |
| 5 | N3 |
| 6 | N3 |

With hash table 110 in place, network switch/router 102 can use resilient hashing to perform the node selection at block 204 by hashing the 5-tuple of the packet using a hash function h(x), thereby computing a hash value that matches one of the bucket indexes (and thus, one of the buckets) in hash table 110. For example, the hash function may be defined as h(x)=k(x) modulo B where k(x) is a checksum function such as CRC-16. Network switch/router 102 can then retrieve from hash table 110 the node ID of the node associated with the matched bucket and select that node for processing the packet.

Because hash function h(x) takes as input the 5-tuple of the packet (which identifies the network flow to which the packet belongs), all packets that belong to the same network flow will hash to the same bucket index and thus result in the selection of the same node. Further, resilient hashing has the benefits of (a) minimizing the number of hash table buckets that need to be modified (or in the words, the amount of "table churn" in the hash table) when a node fails, and (b) enabling relatively even load redistribution of network flows for a failed node. For example, Table 2 below depicts a modified version of hash table 110 (as originally presented in Table 1) after the failure of node N2.

TABLE 2

| Bucket Index | Node Identifier (ID) |
|---|---|
| 1 | N1 |
| 2 | N1 |
| 3 | N1 |
| 4 | N3 |

TABLE 2-continued

| Bucket Index | Node Identifier (ID) |
|---|---|
| 5 | N3 |
| 6 | N3 |

As shown in Table 2, the buckets identified by bucket indexes 3 and 4 are modified to map to nodes N1 and N3 respectively, rather than to failed node N2. Thus, only one third of the buckets are changed and the total number of buckets in the hash table remains the same. In addition, the buckets (and thus network flows) for failed node N2 are evenly redistributed between nodes N1 and N3, rather than being failed over to a single node.

Returning now to FIG. 2, at block 206 network switch/router 102 forwards the packet to the node selected at block 204. In response, the node processes the packet using saved flow state information that the node may have for the network flow to which the packet belongs (block 208). This flow state information can include any type of information pertaining to the current state of the network flow, such as whether certain network protocol procedures have been completed (e.g., a TCP 3-way handshake), packet statistics for the flow, and so on. The specific details of the flow state information stored and used by the nodes of cluster 106 will vary depending on the nature of service S.

Finally, at blocks 210 and 212, the node returns the processed packet to network switch/router 102 (if appropriate) and the switch/router forwards it onward to its intended destination. For example, in the case where service S is a distributed firewall and each node of cluster 106 is a firewall device, the processing performed by the node at step 208 can involve determining whether the packet should be allowed to be delivered to its intended destination per one or more firewall policies and the flow state information for the packet's network flow. If the answer is yes, the node can send the processed packet back to network switch/router 102 per step 210. If the answer is no, the node can drop the packet, as well as optionally forward the dropped packet to an external system for analysis and/or logging.

As mentioned in the Background section, for HA purposes, it is important that the nodes of cluster 106 replicate their respective flow state information to other nodes, referred to as backup nodes, on a periodic basis during normal operation. This allows the network flows of a failed node to be redirected to one or more backup nodes for processing. One approach for implementing HA, known as the active/standby approach, involves deploying a standby backup node for each active node in the cluster. These standby backup nodes do not process any network traffic while their corresponding active nodes are healthy/operational; instead, they simply receive replicated flow state information from those active nodes. When an active node fails, its standby backup node becomes active and takes over the processing of all network flows previously handled by the failed active node. While this approach is relatively straightforward to implement, it is costly because it requires the deployment of a spare standby node for each active node.

Another approach for implementing HA, known as the N+1 redundancy approach, involves deploying a total of N+1 nodes in the cluster, where all N+1 nodes are active and where N is the number of nodes that is needed to satisfy the processing requirements of the service deployment. With this approach, the cluster is effectively overprovisioned with one extra node. In the scenario where there are no node failures, the extra node participates in the processing of incoming traffic, thereby lessening the load on the other nodes. When a node failure occurs, the network flows previously handled by the failed node are redistributed among the N remaining nodes. Because a total of N nodes is sufficient to adequately process all of the network traffic in the environment, the network service can continue to operate without a noticeable degradation in performance, despite the node failure. For the purposes of this disclosure, it is assumed that cluster 106 of FIG. 1 implements this N+1 redundancy approach, such that all three nodes N1, N2, and N3 are active during normal operation and two nodes are sufficient to handle all of the traffic from network 104. As discussed with respect to Table 2 above, if one of these nodes fails, the network flows handled by the failed node are redistributed across the two remaining nodes.

Generally speaking, the N+1 redundancy approach is preferable to the active/standby approach because it does not require a spare standby node for every active node and thus is more cost effective. However, a problem with typical N+1 redundancy is that each node in cluster 106 does not know a priori which other nodes will serve as its backups. Rather, this backup determination is made only at the point of a node failure, for example in the form of modifying the buckets associated with the failed node in hash table 110 to point to other nodes. As a result, each node is required to replicate the flow state information for each network flow it is handling to all other nodes in the cluster, because any one of those other nodes may end up serving as the backup node for that network flow. This means that the compute, network, and memory/storage overheads for replicating the flow state for each network flow grows proportionally with N, which makes it difficult for the cluster to scale to larger sizes.

Figure 3:
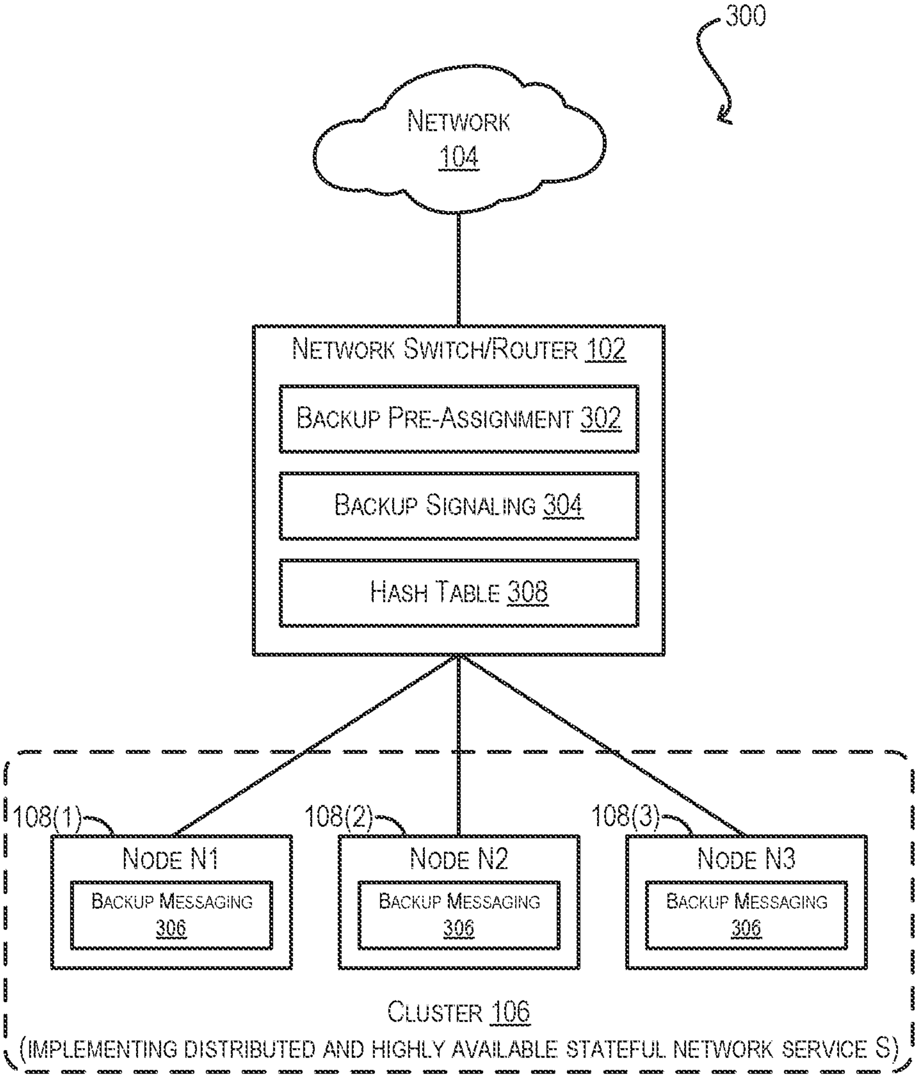
FIG. 3 depicts another example environment in accordance with certain embodiments of the present disclosure.

To address the foregoing and other related problems, FIG. 3 depicts an enhanced version 300 of environment 100 that includes a novel framework for efficiently replicating flow state information among the nodes of cluster 106 according to certain embodiments. As shown, this framework includes new backup pre-assignment and signaling components 302 and 304 in network switch/router 102 and a new backup messaging component 306 in the nodes of cluster 106. Components 302-306 may be implemented in software, hardware, or a combination thereof. The framework also includes a new version 308 of hash table 110 in network switch/router 102.

At a high level, backup pre-assignment component 302 enables network switch/router 102 to "pre-assign" one or more backup nodes to each node in cluster 106, before the occurrence of any node failures. Network switch/router 102 can perform this pre-assignment by associating a backup node with each bucket in hash table 308—in addition to the (primary) node associated with that bucket as previously described with respect to hash table 110—at the time of hash table creation. The backup node associated with a given bucket is the node that will receive and process all network flows which hash to that bucket in the event that the bucket's primary node fails.

Backup signaling component 304 enables network switch/router 102 to signal, in each packet forwarded by the switch/router to a node acting as a primary, backup information indicative of the backup node that has been pre-assigned for handling the packet's network flow. For example, in one set of embodiments this backup information can be the bucket index, or a representation thereof, of the bucket in hash table 308 that the packet hashes to (which in turn maps to the backup node).

And backup messaging component 306 enables each node to replicate, for each network flow that the node is handling as a primary node, the saved flow state information for that flow to the flow's pre-assigned backup node, in accordance with the backup information signaled by network switch/router 102. For example, if the backup information comprises a bucket index, the node can construct a backup message that includes the flow state information for the network flow and can forward the backup message to network switch/router 102 with a static destination IP address that is mapped to the bucket index. In response, network switch/router 102 can route the backup message to the backup node associated with that bucket in hash table 308.

With the general framework shown in FIG. 3 and described above, a number of benefits are realized. First, because network switch/router 102 is able to pre-assign backup nodes and communicate information regarding these pre-assignments to the nodes of cluster 106, each node only needs to replicate the flow state information it holds for a given network flow to one other node (i.e., the pre-assigned backup node for that flow), rather than to all other nodes. Accordingly, this framework results in a constant (i.e., O(1)) overhead for replicating flow state information per network flow and thus allows the number of nodes in cluster 106 to scale with minimal performance impact.

Second, because network switch/router 102 is responsible for backup pre-assignment, the nodes themselves do not need to negotiate or otherwise coordinate with each other in order to carry out this task, thereby simplifying their implementation.

Third, the hashing techniques and hash table 308 employed by network switch/router 102 as part of this framework can be implemented using equal-cost multi-path (ECMP) routing functionality that is built into many existing switches/routers. For example, hash table 308 can be implemented as an ECMP group. Accordingly, network switch/router 102 does not need to be a specialized device that is specific to service S or manufactured by the same vendor as the nodes of cluster 106; rather, network switch/router 102 can be an existing ECMP-capable switch/router connected to network 104 that is modified to incorporate the techniques described herein. In these embodiments, the backup node assignment for each hash table bucket may be stored in the ECMP group itself (e.g., as an additional column), or may be maintained in another data structure that is separate from, but associated with, the ECMP group.

The following sections provide additional details for implementing the techniques of the present disclosure according to certain embodiments, including workflows that may be executed by network switch/router 102 and cluster 106 for pre-assigning backup nodes and replicating flow state information to those pre-assigned backup nodes. It should be appreciated that FIGS. 1-3 are illustrative and not intended to limit embodiments of the present disclosure. For instance, although network switch/router 102 is shown as a singular device, in alternative embodiments the functions of network switch/router 102 may be performed by a group of two or more redundant network devices in order to provide fault tolerance/HA at this layer.

Figure 4:
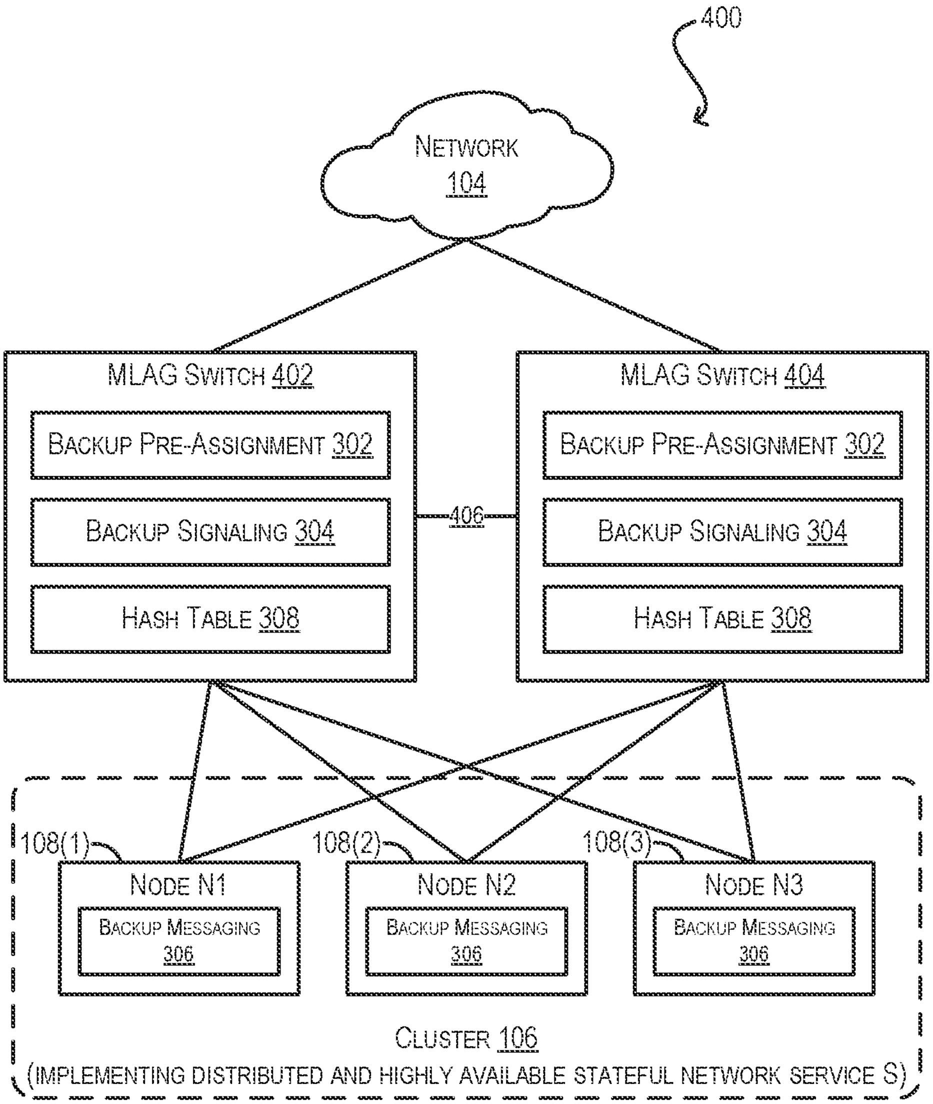
FIG. 4 depicts yet another example environment in accordance with certain embodiments of the present disclosure.

By way of example, FIG. 4 depicts a version 400 of environment 300 that includes a Multi-Chassis Link Aggregation (MLAG) pair of switches 402 and 404 in place of network switch/router 102. As shown, each MLAG switch 402/404 includes a local copy of backup pre-assignment component 302, backup signaling component 304, and hash table 308. With this arrangement, if one of the switches in the MLAG pair fails, the other switch can continue forwarding traffic to cluster 106. To ensure that each MLAG switch 402/404 hashes packets to the same hash table buckets (and thus to the same primary and backup nodes of cluster 106), the switches can communicate with each other over an MLAG link 406 to synchronize their respective hash functions, hash table bucket ordering, and other configuration parameters.

2. Backup Pre-Assignment

Figure 5:
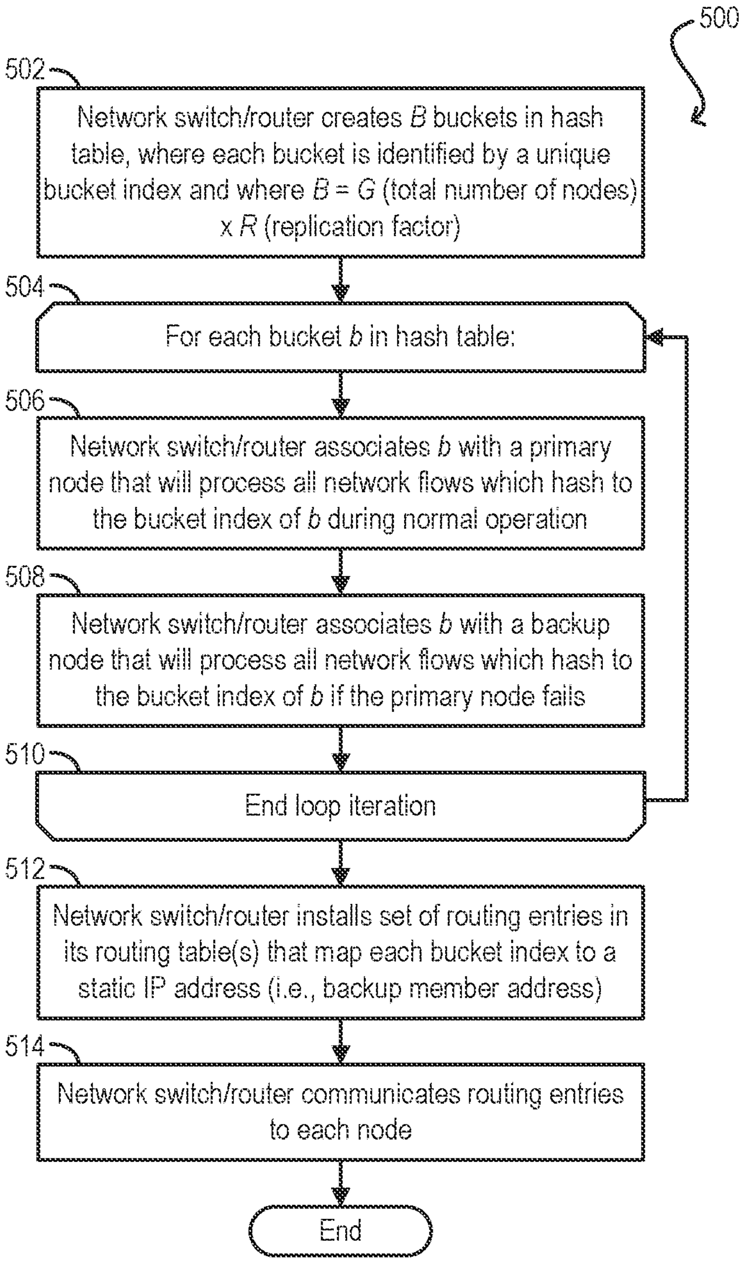
FIG. 5 depicts a backup pre-assignment workflow in accordance with certain embodiments of the present disclosure.

FIG. 5 depicts a workflow 500 that may be executed by network switch/router 102 of FIG. 3 for creating its hash table 308 according to certain embodiments, which includes pre-assigning backup nodes to the buckets of the hash table using backup pre-assignment component 302. In one set of embodiments, network switch/router 102 may execute this workflow upon boot up or initialization of the device.

Starting with block 502, network switch/router 102 can create B buckets in hash table 308, where each bucket is identified by a unique bucket index (e.g., a number from 1 to B) and where B=G (total number of nodes in cluster 106)×R (replication factor). For example, given a replication factor of 2, network switch/router 102 would create 3×2=6 buckets. In certain embodiments, network switch/router 102 may choose a value for B that evenly divides among the number of nodes in cluster 106, both when all nodes are healthy/operational and when one or more nodes have failed.

At block 504, network switch/router 102 can enter a loop for each bucket b in hash table 308. Within this loop, network switch/router 102 can associate bucket b with a first node in cluster 106, thereby designating/assigning that first node as a primary node of the bucket that will process all network flows which hash to the bucket index of b during normal operation (block 506). Network switch/router 102 can perform this step in a manner that ensures each node of cluster 106 is designated as a primary node for at least R buckets.

Further, at block 508, network switch/router 102 can associate bucket b with a second node in cluster 106, thereby designating/assigning that second node as a backup node of the bucket that will process all network flows which hash to the bucket index of b in the event that the bucket's primary node fails. This backup node will necessarily be different from the primary node designated at block 506. In some embodiments, all of the buckets assigned a given primary node may be assigned a single (i.e., the same) backup node. However, for load balancing purposes, it is generally preferable to assign the buckets of a given primary node to different backup nodes, thereby spreading the network flows handled by the primary node across those multiple backups. Upon completing block 508, network switch/router 102 can reach the end of the current loop iteration (block 510) and repeat the loop until all buckets have been processed.

By way of example, Table 3 below depicts an example representation of hash table 308 that has been created and populated in accordance with blocks 502-510, assuming R=2:

TABLE 3

| Bucket Index | Primary Node ID | Backup Node ID |
|---|---|---|
| 1 | N1 | N2 |
| 2 | N1 | N3 |
| 3 | N2 | N1 |
| 4 | N2 | N3 |
| 5 | N3 | N1 |
| 6 | N3 | N2 |

As shown in Table 3, hash table 308 includes a total of six buckets, with two buckets associated with each node of cluster 106 (as primary). Further, each of these two buckets are assigned different backup nodes in the cluster. For example, bucket indexes 1 and 2 are assigned primary node N1 and with backup nodes N2 and N3 respectively.

Returning now to FIG. 5, at block 512 network switch/router 102 can install, in the switch/router's routing table(s), a set of routing entries that map each bucket index of hash table 308 to a static IP address, referred to as the backup node address for that bucket index. The following is an example representation of these routing entries in accordance with the version of hash table 308 shown in Table 3:

TABLE 4

| Bucket Index | Backup Node Address |
|---|---|
| 1 | 169.254.200.1 |
| 2 | 169.254.200.2 |
| 3 | 169.254.200.3 |
| 4 | 169.254.200.4 |
| 5 | 169.254.200.5 |
| 6 | 169.254.200.6 |

Finally, at block 514, network switch/router 102 can communicate these routing entries to each node of cluster 106. As explained in the next section, the nodes can use this routing information during the flow state replication process to transmit backup messages to the backup node associated with a given bucket index.

3. Backup Signaling and Flow State Replication

Figure 6A:
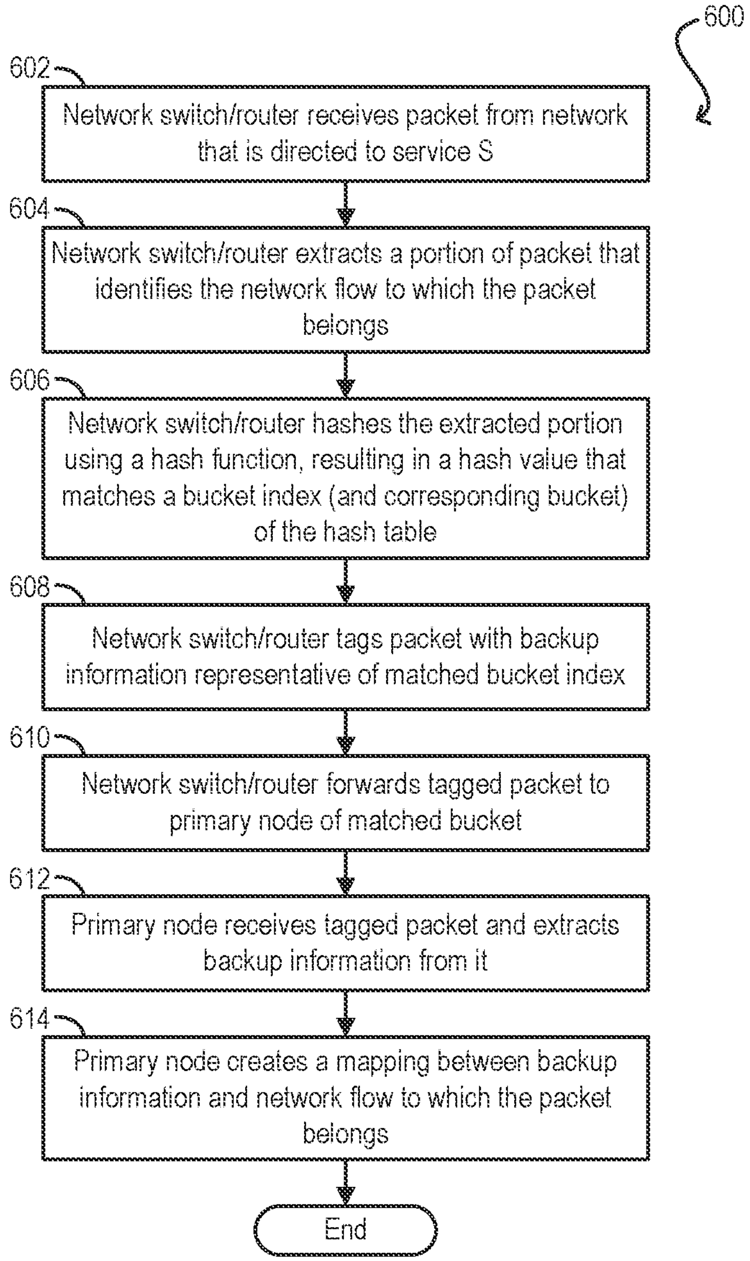
FIGS. 6A and 6B depict backup signaling and flow state replication workflows in accordance with certain embodiments of the present disclosure.
Figure 6B:
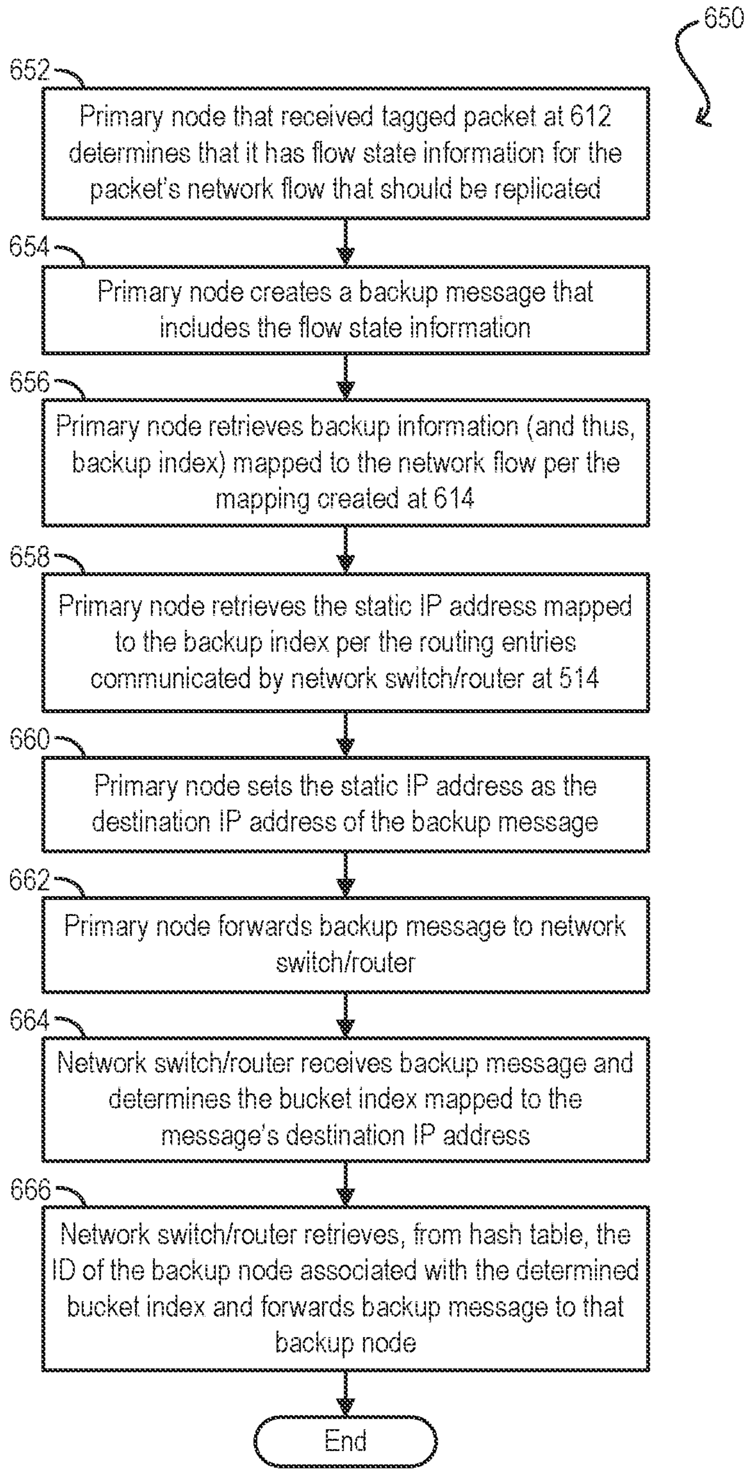

FIGS. 6A and 6B depict workflows 600 and 650 respectively that may be executed by network switch/router 102 and nodes 108(1)-(3) of FIG. 3 for signaling backup information and replicating flow state information (per the backup pre-assignments made by network switch/router 102 via workflow 500) according to certain embodiments.

Starting with block 602 of FIG. 6A, network switch/router 102 can receive a packet from network 104 that is directed to service S for the purpose of being processed by S. For example, the packet may be directed to a virtual IP address associated with service S.

At blocks 604 and 606, network switch/router 102 can extract a portion of the packet that identifies the network flow to which the packet belongs (such as, e.g., the 5-tuple of [source IP address, source port, destination IP address, destination port, protocol] fields) and can hash that portion using a hash function h(x), resulting in the computation of a hash value that matches a bucket index (and thus, a bucket) in hash table 308. As mentioned previously, hash function h(x) may be defined as k(x) modulo B where k(x) is a checksum function such as CRC-16. In certain embodiments hash function h(x) may be symmetric in nature, which means that all packets traveling in both directions of a network flow will hash to the same bucket index.

At block 608, network switch/router 102 can tag the packet with backup information representative of the matched bucket index. For example, the backup information may comprise the matched bucket index itself, or some other value that uniquely maps to the matched bucket index. In one set of embodiments, network switch/router 102 can perform the tagging at block 508 by including the backup information in an existing virtual local area network (VLAN) ID field of the packet. In other embodiments, this tagging may be performed using any other packet fields or any other method (e.g., encapsulating the packet in a new header).

At block 610, network switch/router can forward the tagged packet to the node of cluster 106 that is designated/assigned as the primary node for the matched bucket in hash table 308. In response, this primary node can receive the tagged packet, extract the backup information from the tagged packet, and create a local mapping between that backup information and the network flow to which the packet belongs (if no such mapping already exists) (blocks 612 and 614).

Turning now to block 652 of FIG. 6B, at some later point in time, the primary node that received the tagged packet at block 612 can determine that it has flow state information pertaining to the packet's network flow that should be replicated to a backup node. For example, this may occur when the network flow changes from an unapproved state to an approved state, when the network flow is marked for deletion, or when the primary node determines that the flow state information should be re-sent to the backup node in order prevent aging out of that information on the backup side.

In response to the determination at block 652, the primary node can create a backup message that includes the flow state information (block 654) and retrieve the backup information (and thus, bucket index) mapped to the network flow per the local mapping created at block 614 (block 656). The primary node can further retrieve the static IP address mapped to the bucket index per the set of routing entries communicated by network switch/router 102 at block 514 of FIG. 5 (block 658) and set the retrieved static IP address as the destination IP address for the backup message, thereby directing the backup message to the backup node associated with bucket index (block 660). The primary node can then forward the backup message to network switch/router 102 (block 662).

In certain embodiments, the backup message may be sent via a stateless network protocol (e.g., a protocol that is not TCP) in order to reduce overhead and complexity. In these embodiments, quality of service (QOS) techniques may be employed to ensure that the backup message has a low likelihood of being dropped due to network congestion or other issues.

At block 664, network switch/router 102 can receive the backup message from the primary node and, using the set of routing entries previously installed at block 512, determine the bucket index mapped to the destination IP address of the message. Finally, at block 666, network switch/router 102 can retrieve from hash table 308 the ID of the backup node associated with the bucket index determined at block 664 and can forward the backup message to that backup node. In this way, network switch/router 102 can ensure that the flow state information included in the backup message is replicated to the backup node that was pre-assigned for that network flow.

4. Handling Node Failure and Restoration

When a given (primary) node in cluster 106 fails, network switch/router 102 can detect this failure using any one of a number of techniques and can modify hash table 308 accordingly. For example, in one set of embodiments network switch/router 102 can modify each bucket in the hash table that designates/assigns the failed node as the bucket's primary node to designate/assign the bucket's backup node as its new primary. This will cause all network flows that were previously sent to the failed primary node to be sent to its backup node(s) instead. In addition, network switch/router 102 can re-assign the backup nodes in the hash table as needed, or more specifically modify each bucket in the hash table that designates/assigns the failed node as the bucket's backup node to designate/assign a different backup node. Note that these modifications do not cause a change in the total number of hash table buckets and preserve the existing bucket associations to the extent possible (i.e., they only modify hash table buckets that designate/assign the failed node as either a primary or backup node). This minimizes the number of network flows that are redirected to new/different nodes as a result of the node failure.

To illustrate the foregoing, Table 5 below depicts a modified version of the representation of hash table 308 previously shown in Table 3, after the failure of node N1:

TABLE 5

| Bucket Index | Primary Node ID | Backup Node ID |
|---|---|---|
| 1 | N2 | N3 |
| 2 | N3 | N2 |
| 3 | N2 | N3 |
| 4 | N2 | N3 |
| 5 | N3 | N2 |
| 6 | N3 | N2 |

When a failed node is subsequently restored, the primary and backup assignments in hash table 308 can return to the state they were in prior to the failure. For example, upon restoration of node N1, hash table 308 can revert from the version shown in Table 5 to the version shown in Table 3. This will cause all network flows that were redirected to the restored node's backup node(s) to now be sent to the restored node.

In some embodiments, a restored node will not have flow state information for network flows that were handled by its backup node(s) while the node was down. Accordingly, when the restored node receives a packet that belongs to an unknown network flow, the node can send it to the backup node for the network flow to which the packet belongs. If the backup node recognizes the network flow (i.e., has flow state information for the flow), the backup node can process it appropriately. In addition, the backup node can replicate that flow state information to the restored node (via, e.g., a backup message) so that the restored node has it available for processing future packets that are part of the network flow.

5. Example Network Device

Figure 7:
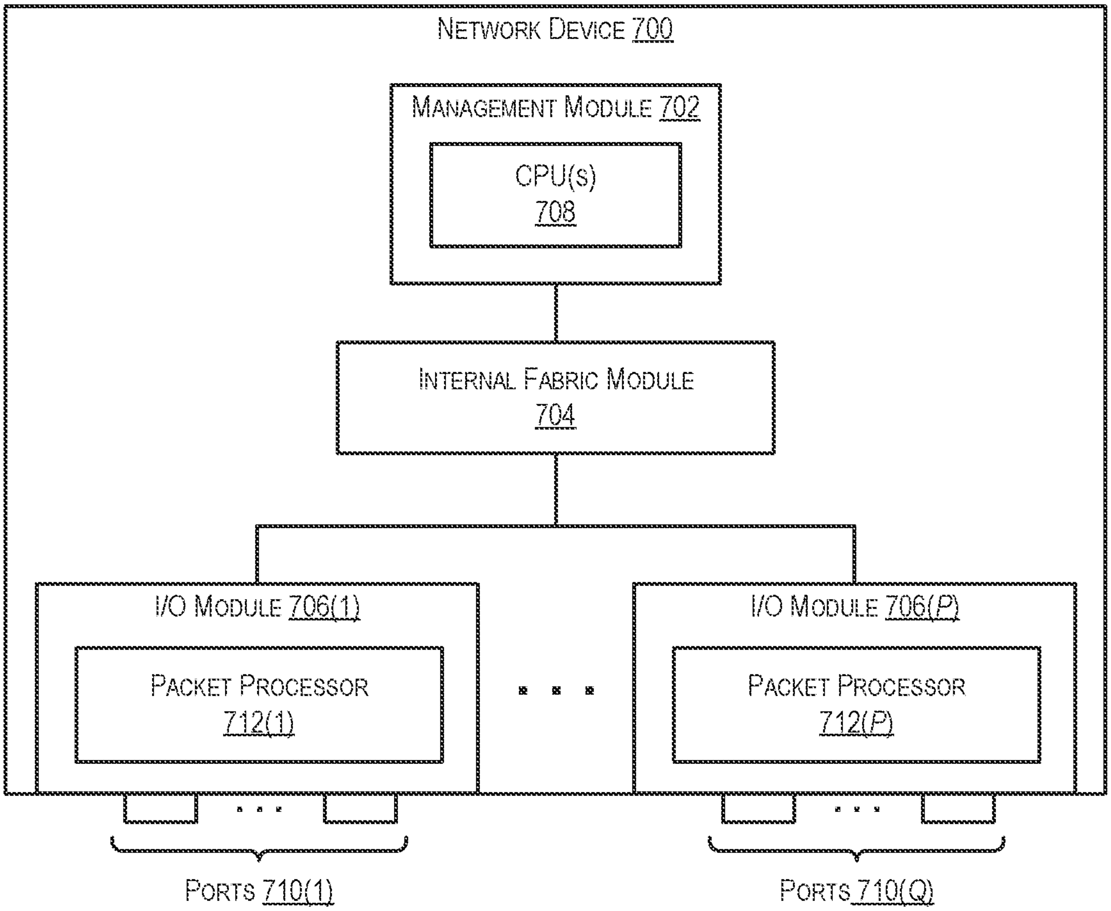
FIG. 7 depicts an example network device in accordance with certain embodiments of the present disclosure.

FIG. 7 depicts an example network device 700 according to certain embodiments of the present disclosure. In one set of embodiments, network device 700 may be used to implement network switch/router 102 of FIGS. 1 and 3 and/or MLAG switches 402 and 404 of FIG. 4.

As shown in FIG. 7, network device 700 includes a management module 702, an internal fabric module 704, and a number of I/O modules 706(1)-(P). Management module 702 includes one or more management CPUs 708 for managing/controlling the operation of the device. Each management CPU 708 can be a general purpose processor, such as an Intel/AMD x86 or ARM-based processor, that operates under the control of software stored in an associated memory (not shown). In certain embodiments, one or more of the techniques described in the present disclosure may be executed wholly, or in part, by management CPUs 708.

Internal fabric module 704 and I/O modules 706(1)-(P) collectively represent the data, or forwarding, plane of network device 700. Internal fabric module 704 is configured to interconnect the various other modules of network device 700. Each I/O module 706 includes one or more input/output ports 710(1)-(Q) that are used by network device 700 to send and receive network packets. Each I/O module 706(1)-(P) can also include a packet processor 712. Packet processor 712 is a hardware processing component (e.g., an application specific integrated circuit (ASIC) or field-programmable gate array (FPGA)) that can make wire speed decisions on how to handle incoming or outgoing network packets. In certain embodiments, one or more of the techniques described in the present disclosure may be implemented wholly, or in part, within packet processors 712(1)-712(P).

It should be appreciated that network device 700 is illustrative and many other configurations having more or fewer components than network device 700 are possible.

6. Example Computer System

Figure 8:
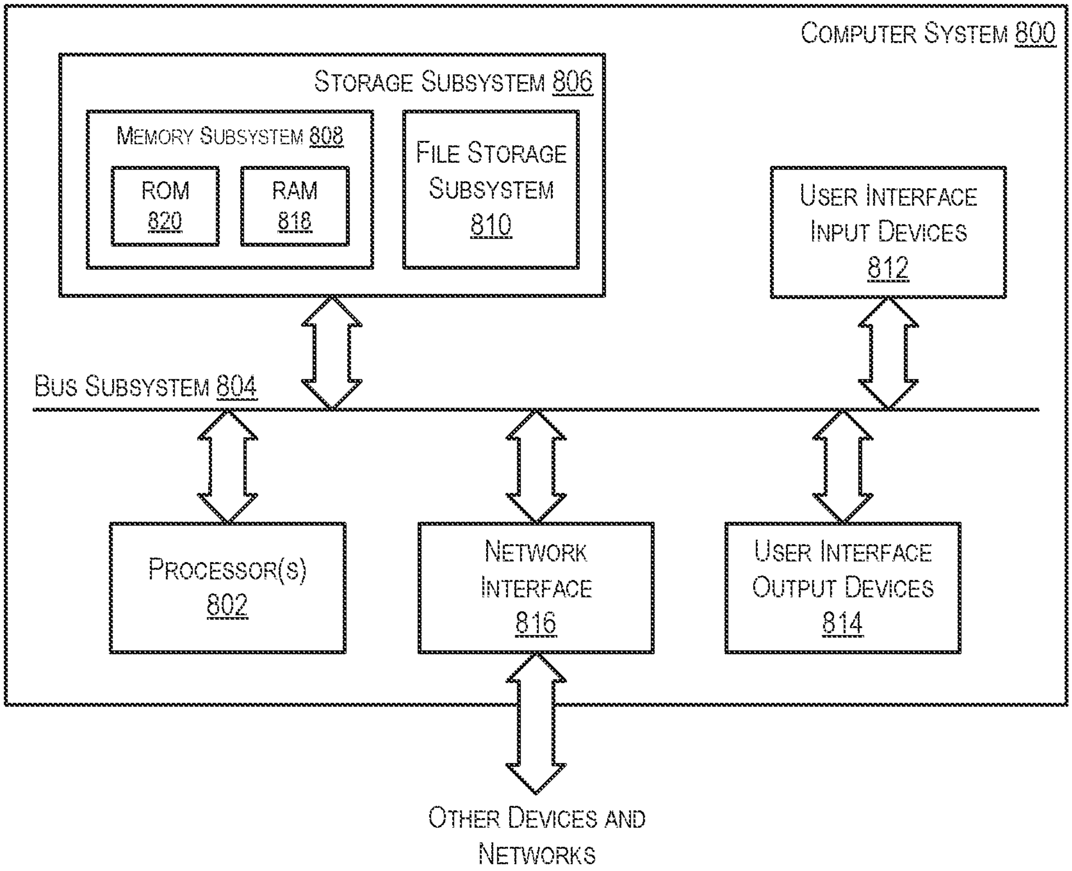
FIG. 8 depicts an example computer system in accordance with certain embodiments of the present disclosure.

FIG. 8 depicts an example computer system 800 according to certain embodiments of the present disclosure. In one set of embodiments, Computer system 800 may be used to implement each node of cluster 106 of FIGS. 1, 3, and 4.

As shown in FIG. 8, computer system 800 includes one or more CPUs 802 that communicate with a number of peripheral devices via a bus subsystem 804. These peripheral devices include a storage subsystem 806 (comprising a memory subsystem 808 and a file storage subsystem 810), user interface input devices 812, user interface output devices 814, and a network interface subsystem 816.

Bus subsystem 804 provides a mechanism for letting the various components and subsystems of computer system 800 communicate with each other as intended. Although bus subsystem 804 is shown schematically as a single bus, alternative embodiments of the bus subsystem can utilize multiple buses.

Network interface subsystem 816 serves as an interface for communicating data between computer system 800 and other computing devices or networks. Embodiments of network interface subsystem 816 can include wired (e.g., coaxial, twisted pair, or fiber optic) and/or wireless (e.g., Wi-Fi, cellular, Bluetooth, etc.) interfaces.

User interface input devices 812 can include a keyboard, pointing devices (e.g., mouse, trackball, touchpad, etc.), a scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 800.

User interface output devices 814 can include a display subsystem such as a flat-panel display or non-visual displays such as audio output devices, etc. In general, use of the term "output device" is intended to include all possible types of devices and mechanisms for outputting information from computer system 800.

Storage subsystem 806 includes a memory subsystem 808 and a file/disk storage subsystem 810. Subsystems 808 and 810 represent non-transitory computer-readable storage media that can store, in a non-transitory state, program code and/or data that provide the functionality of various embodiments described herein.

Memory subsystem 808 includes a number of memories including a main random access memory (RAM) 818 for storage of instructions and data during program execution and a read-only memory (ROM) 820 in which fixed instructions may be stored. File storage subsystem 810 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than computer system 800 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a network device that is communicatively coupled with a cluster of nodes implementing a network service, the method comprising:

creating a table comprising a plurality of buckets, wherein each bucket in the plurality of buckets is identified by a bucket index, and wherein the creating includes, for each bucket:

associating a first node in the cluster of nodes with the bucket, the associating causing the first node to be designated a primary node of the bucket that processes packets directed to the network service which belong to one or more network flows associated with the bucket; and associating a second node in the cluster of nodes with the bucket, the second node being different from the first node, the associating of the second node causing the second node to be designated a backup node of the bucket that processes the packets in an event that the primary node fails;

receiving a packet directed to the network service;

hashing a portion of the packet using a hash function, the portion identifying a network flow to which the packet belongs, the hashing resulting in a hash value that matches a first bucket index of a first bucket in the table;

tagging the packet with backup information representative of the first bucket index; and forwarding the tagged packet to the primary node of the first bucket.

2. The method of claim 1 wherein the creating is performed prior to occurrence of any node failures in the cluster.

3. The method of claim 1 further comprising, upon failure of the primary node of the first bucket:

for each bucket in the table that designates the primary node of the first bucket as a backup node, designating a new node in the cluster of nodes as a backup node of said each bucket;

designating the backup node of the first bucket as the primary node of the first bucket; and refraining from modifying any buckets in the table that do not designate the primary node of the first bucket as either a primary node or a backup node.

4. The method of claim 1 wherein the tagging comprises:

including the backup information in a virtual local area network (VLAN) identifier field of the backup message.

5. The method of claim 1 further comprising:

receiving a backup message from the primary node of the first bucket, the backup message including flow state information pertaining to the network flow and information indicative of the backup information;

determining, based on the information indicative of the backup information, the backup node of the first bucket; and forwarding the backup message to the backup node of the first bucket.

6. The method of claim 5 wherein the information is a destination address that is mapped to the first bucket index.

7. The method of claim 6 wherein the destination address is received by the primary node of the first bucket from the network device upon creation of the table.

8. A network device comprising:

a plurality of ports;

one or more processors that are configured to:

create a table comprising a plurality of buckets, wherein each bucket in the plurality of buckets is identified by a bucket index, and wherein the creating includes, for each bucket:

designating a first node in the cluster of nodes as a primary node of the bucket that processes packets directed to the network service which belong to one or more network flows associated with the bucket; and designating a second node in the cluster of nodes as a backup node of the bucket that processes the packets in an event that the primary node fails;

receive a packet directed to the network service;

hash a portion of the packet using a hash function, the portion identifying a network flow to which the packet belongs, the hashing resulting in a hash value that matches a first bucket index of a first bucket in the table;

tag the packet with backup information representative of the first bucket index; and forward the tagged packet to the primary node of the first bucket.

9. The network device of claim 8 wherein the table is created as an equal-cost multi-path (ECMP) group in the network device.

10. The network device of claim 8 wherein the hash function causes packets traveling in both directions of a network flow to generate a same hash value.

11. The network device of claim 8 wherein the table comprises & X A buckets, G being a number of nodes in the cluster and R being a replication factor.

12. The network device of claim 11 wherein each node in the cluster is designated as a primary node for at least R buckets in the table.

13. The network device of claim 12 wherein each of the at least Æ buckets designates a different backup node.

14. The network device of claim 8 wherein the network device is a Multi-Chassis Link Aggregation (MLAG) device in a pair of MLAG devices.

15. A method performed by a network device that is communicatively coupled with a cluster of nodes implementing a network service, the method comprising:

receiving a packet directed to the network service;

hashing a portion of the packet that identifies a network flow to which the packet belongs, the hashing resulting in a hash value that matches an entry in a table of the network device, the entry identifying a primary node in the cluster for processing the network flow and a backup node for processing the network flow in an event that the primary node fails;

tagging the packet with backup information representative of the entry; and forwarding the tagged packet to the primary node.

16. The method of claim 15 further comprising:

receiving a backup message from the primary node that includes flow state information pertaining to the network flow and information indicative of the backup information; and forwarding the backup message to the backup node.

17. The method of claim 16 wherein the primary node sends the backup message upon determining a change in state of the network flow.

18. The method of claim 16 wherein the primary node sends the backup message using a stateless network protocol.

19. The method of claim 15 further comprising, upon failure of the primary node:

modifying the entry in the table to designate the backup node as a new primary node for processing the network flow.

20. The method of claim 19 further comprising, upon restoration of the primary node after the failure:

reverting the modifying of the entry.

* * * * *